(12) United States Patent
Dube et al.

(10) Patent No.: US 10,005,021 B1
(45) Date of Patent: Jun. 26, 2018

(54) SYSTEM AND METHOD FOR RECOVERING AMMONIA FROM A GAS STREAM

(71) Applicant: GENERAL ELECTRIC TECHNOLOGY GMBH, Baden (CH)

(72) Inventors: Sanjay Kumar Dube, Knoxville, TN (US); Stephen Alan Bedell, Knoxville, TN (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days. days.

(21) Appl. No.: 15/388,026

(22) Filed: Dec. 22, 2016

(51) Int. Cl.
| | |
|---|---|
| C01C 1/10 | (2006.01) |
| C01C 1/12 | (2006.01) |
| B01D 53/14 | (2006.01) |
| B01D 53/58 | (2006.01) |
| B01D 53/62 | (2006.01) |
| B01D 53/74 | (2006.01) |
| B01D 53/75 | (2006.01) |

(52) U.S. Cl.
CPC ..... *B01D 53/1425* (2013.01); *B01D 53/1475* (2013.01); *B01D 53/1493* (2013.01); *C01C 1/10* (2013.01); *B01D 2252/102* (2013.01)

(58) Field of Classification Search
CPC .. C01C 1/10; C01C 1/12; B01D 53/14; B01D 53/58; B01D 53/62; B01D 53/1475; B01D 53/74; B01D 53/75; B01D 2251/206; B01D 2251/60; B01D 2251/61; B01D 2257/406
See application file for complete search history.

(56) References Cited

U.S. PATENT DOCUMENTS

| | | | |
|---|---|---|---|
| 3,985,863 A * | 10/1976 | Rice ................. | B01D 53/14 423/238 |
| 8,821,822 B2 * | 9/2014 | Ungar ............... | B01D 53/1425 423/168 |
| 8,986,640 B1 | 3/2015 | Dube | |
| 9,155,990 B2 | 10/2015 | Graff et al. | |
| 9,238,191 B2 | 1/2016 | Nagayasu et al. | |

* cited by examiner

*Primary Examiner* — Timothy C Vanoy
(74) *Attorney, Agent, or Firm* — GE Global Patent Operation; Cynthia W. Flanigan (57) ABSTRACT

A system for recovering ammonia from a gas stream is provided. The system includes a regenerator and a carbon dioxide wash station.

16 Claims, 4 Drawing Sheets

SYSTEM AND METHOD FOR RECOVERING AMMONIA FROM A GAS STREAM

TECHNICAL FIELD

Embodiments of the invention relate generally to technologies for recovering ammonia from a gas stream.

BACKGROUND

In the combustion of a fuel, such as coal, oil, peat, waste, etc. in a combustion plant, such as those associated with boiler systems for providing steam to a power plant, a hot process (or flue gas) is generated. Such a flue gas will contain, among other things, carbon dioxide ($CO_2$), sulfur dioxide ($SO_2$), hydrogen disulfide ($H_2S_2$), and/or carbonyl sulfides (OCS). A variety of methods and technologies exist in order to remove the pollutants from the flue gases. One method for the removal of carbon dioxide from a post-combustion flue gas is the Chilled Ammonia Process (CAP).

With this the absorption of carbon dioxide from the flue gas is achieved by contacting a chilled ammonia ionic solution (or slurry) with the flue gas. For example, the flue gas is brought into countercurrent contact with an absorption solution, for example, a liquid ammonia-based solution or slurry, in an absorber. In the absorber, a contaminant-free, i.e., "lean" gas stream is formed and a contaminant-rich absorbent, i.e., a "rich" solution is formed.

After having absorbed the contaminants, the "rich" solution is sent to be "regenerated", where heat and pressure are used to separate the absorbent solution from the contaminants in order to create an absorbent solution that can be re-used in the absorber to capture further contaminants.

One of the highest cost penalties of the absorption-capture type systems is the regenerator. The heat and energy required to release the contaminants from the solution heavily burdens the rest of the plant.

For example, the regeneration process is generally performed at elevated pressure, such as 10-150 bara, and temperature, such as 50-200° C. The pressure is generally created by means of a high pressure pump arranged in connection with the regenerator. Regenerators typically operate at a high internal pressure and require the use of high-pressure steam to sufficiently heat the ammonia-based solution to release the carbon dioxide from the ionic solution. Under these conditions, (i.e., high pressure and temperature), nearly all of the absorbed carbon dioxide is released into the gas phase in order to form the $CO_2$-rich gas stream.

The gas phase may also comprise a minor portion of gaseous $NH_3$ (i.e., ammonia slip), which can be condensed and returned to the capture system for use in capturing further $CO_2$ from the gas stream.

In some cases, steam can be used for heating from other parts of the power plant, but then that is at a cost to the plants' electric output and production.

Additionally, the regenerator may also include a reboiler for heating. While this may reduce the need for steam, this further taxes the plant by requiring the additional energy to run the reboiler.

As high-pressure steam stores/contains a significant amount of thermal energy, it is usually considered a valuable commodity. Thus, heating an ammonia-based solution to facilitate release of the $CO_2$ is often an expensive process.

Further, the $CO_2$-rich gas stream produced by a regenerator is typically stored/transported at a pressure at/or near the internal operating pressure of the regenerator. The high pressure of the $CO_2$-rich gas stream produced by a regenerator operating at a high internal pressure may provide benefits such as reducing the amount of ammonia in the $CO_2$ product, but also minimizes the downstream compressor duty. While these benefits are useful, they come at the cost of requiring high-pressure steam and increasing the overall electric demand, which penalizes the power plant output.

In some instances, it may be that the customer wants the $CO_2$ product at a lower pressure for use in applications/processes requiring $CO_2$ at lower pressures. To meet these needs by reducing/lowering the pressure of $CO_2$-rich gas stream (as produced by a regenerator operating at a high internal pressure) is typically an expensive process.

Furthermore, when operating the regenerator at a lower pressure, the ammonia slip increases substantially, thus increasing the operating costs and ultimately not reducing steam consumption because of the increased duty of the stripper.

What is needed, therefore, is an improved system and method for recovering ammonia from a gas stream.

BRIEF DESCRIPTION

In an embodiment, a system for recovering ammonia from a gas stream is provided. The system includes a regenerator and a carbon dioxide wash station. The regenerator is configured to heat a carbon dioxide-rich ammonia-based solution at a low internal pressure to generate a carbon dioxide-rich gas stream including residual ammonia. The carbon dioxide wash station is configured to receive both the carbon dioxide-rich gas stream and an acidic solution having a dissolved acidic salt and bring them into contact to produce an ammonia-rich solution.

In another embodiment, a method for recovering ammonia from a gas stream is provided. The method includes: heating a carbon dioxide-rich ammonia-based solution in a regenerator so as to produce a carbon dioxide-rich gas stream; operating the regenerator at a low internal pressure so that the carbon dioxide-rich gas stream includes residual ammonia; forwarding the carbon dioxide-rich gas stream including residual ammonia to a carbon dioxide wash station; and contacting the residual ammonia from the carbon dioxide-rich gas stream with an acidic solution having a dissolved acidic salt to produce an ammonia-rich solution.

In yet another embodiment, a carbon dioxide wash station for recovering ammonia from a gas stream is provided. The carbon dioxide wash station includes a body having a first opening, a second opening, a third opening, and a fourth opening. The first and the second openings define a flow path for the gas stream within the body. The first opening is for allowing the gas stream to enter the flow path after having been generated via heating of a carbon dioxide-rich ammonia-based solution within a regenerator that operates at a low internal pressure such that the gas stream includes carbon dioxide and residual ammonia. The third opening is for receiving an acidic solution having a dissolved acidic salt that is contacted with the gas stream along the flow path so as to absorb some of the residual ammonia from the gas stream to produce an ammonia-rich solution and a carbon dioxide-rich gas stream. The second opening is for allowing the carbon dioxide-rich gas stream to exit the body. The fourth opening is for allowing the ammonia-rich solution to exit the body.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly.

The term "real-time," as used herein, means a level of processing responsiveness that a user senses as sufficiently immediate or that enables the processor to keep up with an external process.

As used herein, "electrically coupled", "electrically connected", and "electrical communication" mean that the referenced elements are directly or indirectly connected such that an electrical current, or other communication medium, may flow from one to the other. The connection may include a direct conductive connection, i.e., without an intervening capacitive, inductive or active element, an inductive connection, a capacitive connection, and/or any other suitable electrical connection. Intervening components may be present.

As also used herein, the term "fluidly connected" means that the referenced elements are connected such that a fluid (to include a liquid, gas, and/or plasma) may flow along a flow path from one to the other.

The term "stream," as used herein, refers to the sustained movement of a substance, e.g., a gas, solid, liquid, and/or plasma.

Accordingly, the terms "upstream" and "downstream," as used herein, describe the position of the referenced elements with respect to a flow path of a gas, solid, liquid, and/or plasma flowing between and/or near the referenced elements.

As also used herein, the term "heating contact" means that the referenced elements are in proximity of one another such that heat/thermal energy can transfer between them.

Additionally, the terms, "stripping" and "stripped," as used herein, refer to the process by which an element and/or compound in a gas, that includes additional elements and/or compounds, is physically separated/removed from the gas.

Further, as used herein, the term "sorbent" refers to a substance that has the property of collecting/containing/absorbing/storing molecules of another substance.

Accordingly, the term "lean," as used herein with respect to sorbents and other substances, describes the state of a sorbent or substance when stripped of, lacking, or containing a relatively low amount of molecules of another substance. Similarly, the terms "loaded" and "rich," as used herein with respect to sorbents and other substances, describe the state of a sorbent or substance when containing a relatively high amount of molecules of another substance. For example, a "$CO_2$ loaded" or "$CO_2$-rich" gas or liquid contains a higher amount of $CO_2$ than a "$CO_2$-lean" gas or liquid.

As used herein, the terms "internal pressure" and "internal operating pressure" refer to the pressure of the interior of a regenerator while in operation.

As used herein, the term "low internal pressure" refers to an atmospheric pressure of an interior of a regenerator that would generate typically unacceptable amounts of ammonia emissions leaving with the $CO_2$-rich gas stream, e.g., amounts that potentially exceed a regulatory standard.

While the embodiments disclosed herein are described with respect to a CAP system and methods thereof, it is to be understood that embodiments of the present invention may be applicable to other systems and/or processes where a first substance needs to be separated from a second substance.

Figure 1:
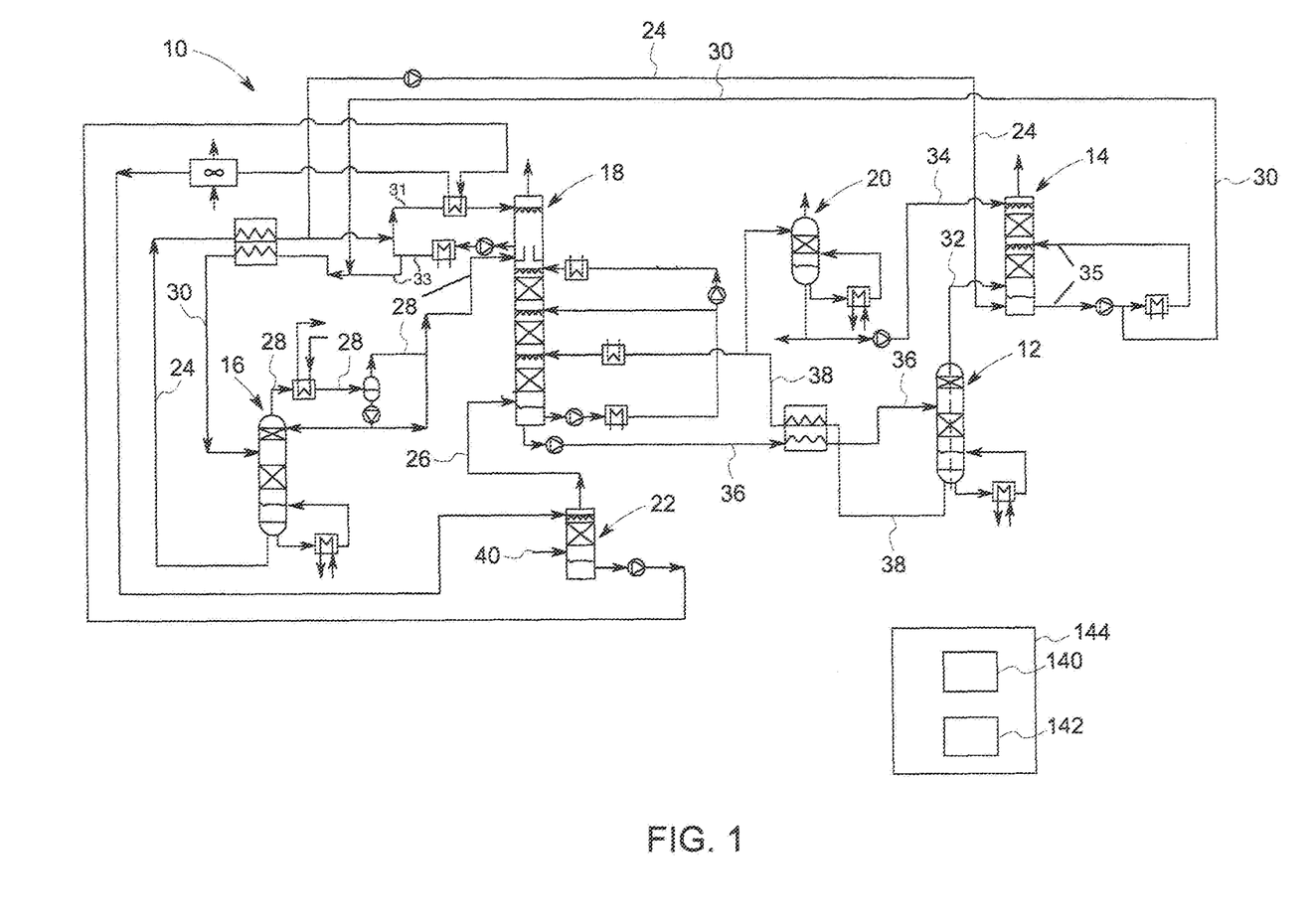
FIG. 1 is a schematic block diagram of a system for recovering ammonia from a gas stream in accordance with an embodiment of the present invention.

Referring now to FIG. 1, the components of an exemplary system 10 that incorporates embodiments of the present invention is shown.

The system 10 includes a regenerator 12 that generates a $CO_2$-rich gas stream by heating a $CO_2$-rich ammonia-based solution.

The regenerator 12 operates at a low internal pressure such that the $CO_2$-rich gas stream also includes residual ammonia.

A $CO_2$ wash station 14 is fluidly connected to the regenerator 12 so as to receive the $CO_2$-rich gas stream from the regenerator 12.

The $CO_2$ wash station 14 absorbs the residual ammonia from the $CO_2$-rich gas stream by contacting the $CO_2$-rich gas stream with an acidic solution having a dissolved acidic salt in order to produce an ammonia-rich solution. As will be appreciated, the ammonia-rich solution may be an ammonia based salt, i.e., the ammonia-rich solution may be an ammonia-rich salt solution.

In embodiments, the system 10 may further include an ammonia stripper 16 fluidly connected to and integrated with the $CO_2$ wash station 14. The ammonia stripper is configured to receive the ammonia-rich solution from the $CO_2$ wash station 14 and facilitate release of the residual ammonia from the ammonia-rich solution via heating the ammonia-rich solution to produce an ammonia-rich gas stream and the acidic solution.

In embodiments, the system 10 may further include a $CO_2$ absorber 18 fluidly connected to the ammonia stripper 16 so as to receive the ammonia-rich gas stream from the ammonia stripper 16. In the $CO_2$ absorber 18 the ammonia-rich gas stream is brought into contact with a $CO_2$-rich flue gas to generate the $CO_2$-rich ammonia-based solution and a $CO_2$-lean flue gas The $CO_2$ absorber 18 is further fluidly connected to the regenerator 12 such that the regenerator 12 receives the $CO_2$-rich ammonia-based solution from the $CO_2$ absorber 18. The $CO_2$-rich ammoniated solution is forwarded to the regenerator where it is heated to release the $CO_2$ from the ammonia-based solution and form a $CO_2$-rich, gas stream and a $CO_2$-lean ammoniated solution.

In embodiments, the system 10 may further include an appendix stripper 20 fluidly connected to and integrated with the $CO_2$ wash station 14 such that the $CO_2$ wash station 14 receives a used wash water stream from the appendix stripper 20.

In the chilled ammonia process described, water will typically accumulate in the ionic or ammoniated solution as it circulates between the absorber and the regenerator. This accumulation of water is a consequence of the difference in water (moisture) content between the gas stream fed to the $CO_2$ absorber and the gas steam leaving the absorber.

Moisture present in the feed gas steam will typically precipitate in the low temperature region of the absorber. This accumulated water acts to dilute the ionic solution as it circulates between the absorber and regenerator, thereby reducing the ability of the ionic solution to "capture" carbon dioxide from a flue gas stream. As a result, the process is less efficient and leads to requiring make-up ionic solution to be added.

In order to maintain the effectiveness of the ionic solution, it is necessary to remove the water. It is also important that any efforts to remove the water minimize any ammonia or ionic solution loss.

In embodiments, the appendix stripper 20 is configured to receive a portion of the circulating ammoniated solution, separate the solution into an $NH_3$ rich gas phase and a $NH_3$ lean liquid phase. The $NH_3$ rich gas phase is then re-introduced to the circulating ammoniated solution stream. The $NH_3$ lean liquid phase, mainly consisting of water, is forwarded to the carbon dioxide wash station via conduit 34.

Referring back to FIG. 2, the appendix stripper 20 has a first end 132 and a second end 134, wherein used wash water, i.e., water having a low amount of impurities, collects in the first end 132.

Figure 2:
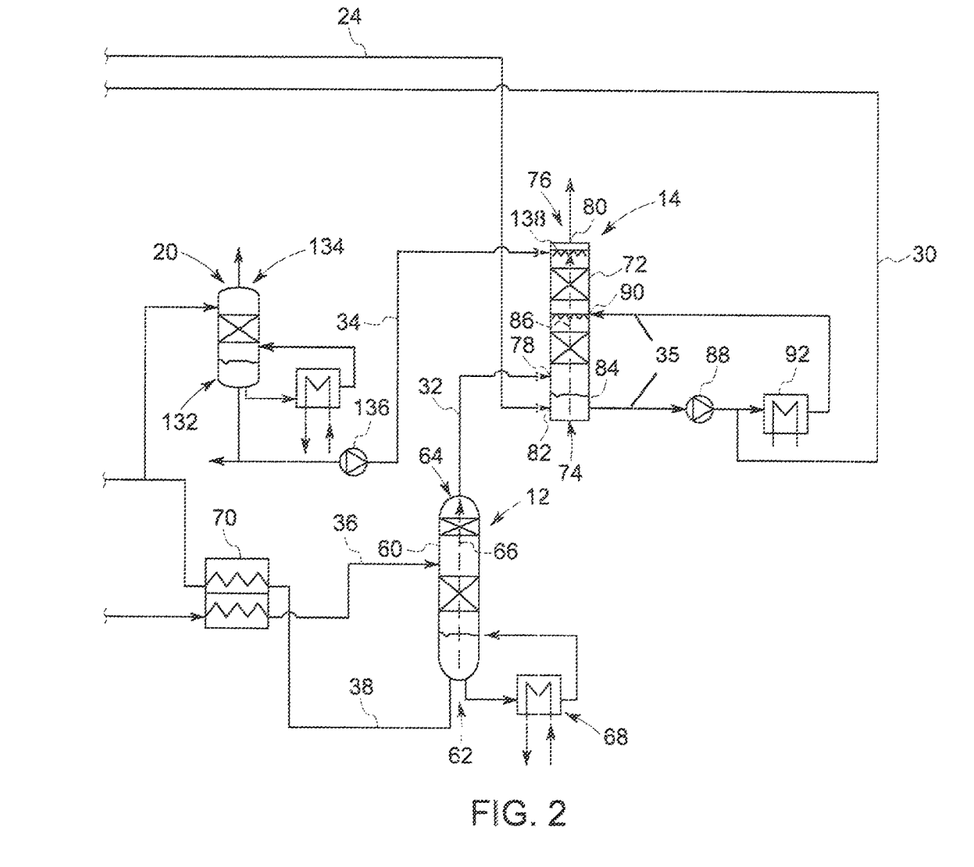
FIG. 2. is a schematic block diagram of a regenerator, a $CO_2$ wash, and an appendix stripper of the system of FIG. 1 in accordance with an embodiment of the present invention.

As stated above, in embodiments, used wash water from the appendix stripper 20 may be forwarded to the $CO_2$ wash station 14.

As will be appreciated, the stripping of ammonia from the $CO_2$-lean ammonia-based solution results in the production of bottom water, which, as stated above, collect/pools in the first end 132. Accordingly, in embodiments, the first end 132 of the appendix stripper 20 may be fluidly connected to the $CO_2$ wash station 14 via conduit 34 such that the bottom water is introduced into the flow path 86 of the $CO_2$ wash 14 via pump 136 and spray nozzles 138. As will be appreciated, in embodiments, the spray nozzles 138 may be located at and/or near the second end 76 of the $CO_2$ wash 14 so as to provide a final cleansing/polishing of the $CO_2$-rich gas stream prior to transportation and/or storage.

As further shown in FIG. 1, in embodiments, the system 10 may further include a direct contact cooler ("DCC") 22 and/or a plurality of conduits 24, 26, 28, 30, 31, 32, 33, 34, 35, 36, 38, 40 that fluidly connect one or more of the various components of the system 10 to each other.

Turning now to FIG. 2, the regenerator 12 and $CO_2$ wash station 14 are shown.

In embodiments, the regenerator 12 includes a body 60 with a first end 62 and a second end 64 that define a flow path 66. The $CO_2$-rich ammonia-based solution flows into the regenerator 12 via conduit 36 at a location between the first 62 and second 64 ends.

As stated above, the regenerator 12 generates a $CO_2$-rich gas stream via heating the $CO_2$-rich ammonia-based solution, which in embodiments, may be accomplished with steam and/or a reboiler 68.

Heating the $CO_2$-rich ammonia-based solution causes $CO_2$ to separate from the $CO_2$-rich ammonia-based solution. The separated $CO_2$ then forms the $CO_2$-rich gas stream, which flows along the flow path 66 to the second end 64 where the gas stream exits the regenerator 12 and is forwarded to the $CO_2$ wash station 14 via conduit 32. The $CO_2$-lean ammonia-based solution is forwarded from the regenerator 12 to the $CO_2$ absorber 18 (FIGS. 1 and 4) via conduit 38.

While the majority of the ammonia in the $CO_2$-rich ammonia-based solution that flows into the regenerator 12 via conduit 36 leaves the regenerator 12 via conduit 38 as the $CO_2$-lean ammonia-based solution, as will be understood, some of the ammonia will leave the regenerator 12 via conduit 32 as residual ammonia in the gas stream. In particular, the regenerator is operated at conditions in order to increase the ammonia slip as compared to normal operations. For example, in embodiments, the ammonia slip leaving the regenerator 12 via conduit 32 may be greater-than-or-equal-to 10 ppm, and in some embodiments, may be too great (without subsequent processing) for direct emission into the environment under various environmental regulations.

As will be further understood, the amount of residual ammonia in the gas stream exiting the regenerator 12 is based at least in part on the internal operating pressure of the regenerator 12. In particular, in embodiments, the higher or lower the internal operating pressure of the regenerator 12, the lower or higher the amount of residual ammonia in the exiting gas stream, respectively.

As stated above, the regenerator 12 operates at low internal pressures. For example, in embodiments, the regenerator 12 may operate at internal atmospheric pressures less than or equal to about 20 bara, and in some embodiments, the regenerator 12 may operate at internal pressures less than or equal to about 5 bara.

As will be appreciated, in embodiments, the aforementioned reboiler 68 may directly heat the $CO_2$-rich ammonia-based solution, i.e., the reboiler 68 may be a gas/or solid fuel burner or an electric heating coil. In other embodiments, the reboiler 68 may indirectly heat the $CO_2$-rich ammonia-based solution, i.e., the reboiler 68 may be a heat-exchanger that brings the $CO_2$-rich ammonia-based solution into heating contact with steam which, in embodiments, may be generated by a boiler (not shown). In such embodiments, the steam may have a low pressure, e.g., at/or between about 8-10 bara.

Additionally, conduits 36 and 38 may be placed in heating contact with a heat exchanger 70 so as to provide control over the temperature of the $CO_2$-rich ammonia-based solution entering the regenerator 12 and the temperature of the $CO_2$-lean ammonia-based solution entering the absorber 18.

As further shown in FIG. 2, the $CO_2$ wash station 14 is downstream of and fluidly connected to the regenerator 12 via conduit 32.

In embodiments, the $CO_2$ wash station 14 includes a body 72 having a first end 74 and a second end 76, a first opening 78, a second opening 80, a third opening 82, and a fourth opening 84.

The first 78 and the second 80 openings define a flow path 86, wherein the first opening 78 receives the gas stream from conduit 32 and allows the gas stream to enter the flow path 86 and exit the body 72 via the second opening 80, whereupon the $CO_2$ may be stored in a containing vessel/tank or transported for use in another process.

The third opening 82 receives the acidic solution, i.e., the solution having the dissolved acidic salt, via conduit 24 which is then contacted with the gas stream along the flow path 86 such that the acidic solution absorbs some, and/or all, of the residual ammonia from the gas stream to produce an ammonia-rich solution and a $CO_2$-rich gas stream. In other words, the acidic salts within the acidic solution act as a sorbent with respect to the residual ammonia in the gas stream.

The fourth opening 84 allows the ammonia-rich solution to exit the body 72 of the $CO_2$ wash station 14 and flow into conduit 30.

As will be appreciated, in embodiments, the acidic solution and the ammonia-rich solution may collect in the first end 74 of the $CO_2$ wash station 14. Accordingly, the acidic solution/ammonia-rich solution mixture may be withdrawn and recycled within the wash station.

For example, a portion of the withdrawn stream is returned via conduit 35 such that the acidic solution contacts the gas stream as the gas stream travels along the flow path 86 from the first opening 78 to the second opening 80. As shown in FIG. 2, a pump 88 may be disposed within conduit 35, and the $CO_2$ wash station 14 may further include spray nozzles 90 which are fluidly connected to conduit 35.

In embodiments, the portion of the withdrawn stream may be cooled as it is recycled via heat exchanger 92 so as to minimize and/or eliminate the amount of residual ammonia within the gas stream exiting the $CO_2$ wash station 14 via the second opening 80.

For example, the $CO_2$ wash station 14 may be configured to limit the amount of residual ammonia within the gas stream exiting the $CO_2$ wash station 14 to less-than-or-equal-to 10 ppm.

Figure 3:
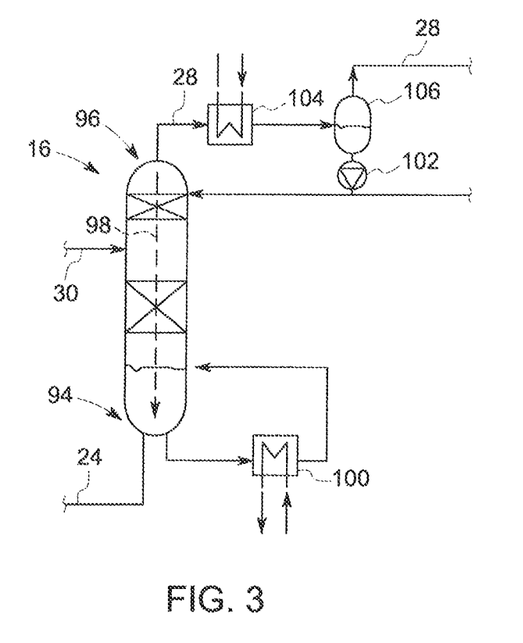
FIG. 3 is a schematic block diagram of an ammonia stripper of the system of FIG. 1 in accordance with an embodiment of the present invention.

As shown in FIG. 3, in certain embodiments, the ammonia stripper 16 includes a first end 94 and a second end 96 that define a flow path 98. As will be appreciated, the ammonia stripper 16 receives the ammonia-rich solution from the $CO_2$ wash station 14 (FIGS. 1 and 2) via conduit 30. The ammonia-rich solution may be heated prior to entering the stripper to between about 30-100° C. Once received, the ammonia-rich solution travels along the flow path 98 towards the first end 94 and collects in the first end 94 where a portion may be withdrawn, heated by a reboiler 100 and returned to the stripper.

As will be appreciated, heating the ammonia-rich solution facilitates release of the ammonia from the ammonia-rich solution, thus forming an ammonia-rich gas stream and an acidic solution.

The ammonia-rich gas stream then exits the ammonia stripper 16 via conduit 28 where it is forwarded to the absorber 18. The ammonia-rich gas stream may be driven by a pump 102 through a heat exchanger 104 and a gas-liquid separator 106 so as to condition the ammonia-rich gas by removing any residual liquid/moisture, e.g., water (which in embodiments, may be returned back to the ammonia stripper 16.)

In some embodiments, the ammonia stripper 16 may operate under a vacuum depending on the type of acidic salt used in the acidic solution. The acidic solution is then returned back to the $CO_2$ wash station 14 (FIGS. 1 and 2) via conduit 24.

As will be appreciated, use of an acidic salt with a low thermal decomposition temperature, e.g., ammonium acetate and/or ammonium phosphate, as a sorbent for capturing residual ammonia, permits for low pressure steam to be used for the thermal recovery of ammonia from the ammonia-rich solution within the ammonia stripper 16.

Figure 4:
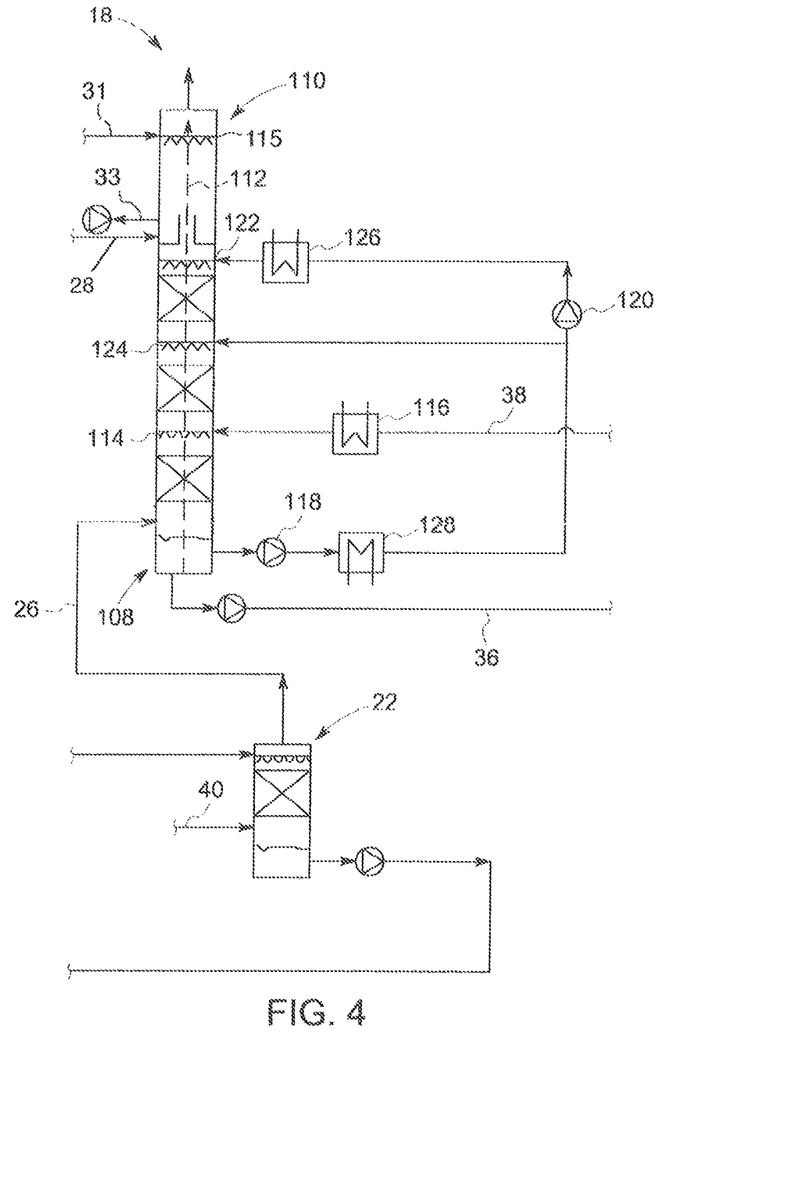
FIG. 4 is a schematic block diagram of a $CO_2$ absorber of the system of FIG. 1 in accordance with an embodiment of the present invention.

Turning now to FIG. 4, in embodiments, the $CO_2$ absorber 18 includes a first end 108 and a second end 110 that define a flow path 112.

The $CO_2$ absorber 18 may be fluidly connected to the ammonia stripper 16 (FIGS. 1 and 3) via conduit 28 so as to receive the ammonia-rich gas stream. As will be appreciated, the ammonia-rich gas stream contacts the $CO_2$-rich flue gas along the flow path 112 to generate the $CO_2$-rich ammonia-based solution.

As also shown in FIG. 4, the $CO_2$ absorber 18 additionally receives a $CO_2$-rich flue gas via conduit 26, which travels along the flow path 112 and exits the second end 110.

As further shown in FIG. 4, the flue gas may enter the system 10 via conduit 40 where it is cooled by the DCC 22 prior to entering the $CO_2$ absorber 18 via conduit 26. In embodiments, the DCC 22 conditions, e.g., cools and/or desulfurizes, the $CO_2$-rich flue gas. For example, in embodiments, the flue gas leaving the DCC 22 via conduit 26 may have a temperature between 0-40° C., and in some embodiments, between 0-5° C.

The $CO_2$ absorber 18 additionally receives a $CO_2$-lean ammonia-based solution from the regenerator 12 (FIGS. 1 and 2) via conduit 38, which is introduced into the flow path 112 via spray nozzles 114 and cooled via heat exchanger 116 such that it also contacts the $CO_2$-rich flue gas to produce the $CO_2$-rich ammonia-based solution and a $CO_2$-lean flue gas. The $CO_2$-lean flue gas then exits the $CO_2$ absorber 18 at the second end As will be understood, some of the $CO_2$-rich ammonia-based solution may be recycled countercurrent to the $CO_2$-rich flue gas along the flow path 112 via pumps 118, 120 and cooled via heat exchangers 126 and 128 prior to entering via spray nozzles 122 and 124. The $CO_2$ absorber 18 may further include spray nozzles 115 which are disposed at or near the second end 110 and fluidly connected to conduit 31.

The $CO_2$-rich ammonia-based solution leaving the absorber 18 is forwarded to the regenerator 12 via conduit 36.

Finally, returning back to FIG. 1, it is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the system 10 may include at least one processor 140, and system memory/data storage structures 142 in the form of a controller 144. The memory 142 may include random access memory (RAM) and read-only memory (ROM). The at least one processor 140 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that provides for control, which may be in real-time, over one or more of the various components of the system 10, e.g., the regenerator 12, $CO_2$ wash 14, ammonia stripper 16, etc., may be read into a main memory of the at least one processor 140 from a computer-readable medium. The term "computer-readable medium," as used herein, refers to any medium that provides or participates in providing instructions to the at least one processor 140 of the system 10 (or any other processor of a device described herein) for execution. Such a medium may take many forms, including but not limited to, non-volatile media and volatile media.

While in embodiments, the execution of sequences of instructions in the software application causes the at least one processor 140 to perform the methods/processes described herein, hard-wired circuitry may be used in place of, or in combination with, software instructions for implementation of the methods/processes of the present invention.

Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for recovering ammonia from a gas stream is provided. The system includes a regenerator and a carbon dioxide wash station. The regenerator is configured to heat a carbon dioxide-rich ammonia-based solution at a low internal pressure to generate a carbon dioxide-rich gas stream including residual ammonia. The carbon dioxide wash station is configured to receive both the carbon dioxide-rich gas stream and an acidic solution having a dissolved acidic salt and bring them into contact to produce an ammonia-rich solution. In certain embodiments, the internal pressure is less than or equal to about 20 bara. In certain embodiments, the internal pressure is less than or equal to about 5 bara. In certain embodiments, the acidic salt is a weak acid. In certain embodiments, the acidic salt is ammonium acetate or ammonium phosphate. In certain embodiments, the acidic salt has a low thermal decomposition temperature. In certain embodiments, the system further includes an ammonia stripper configured to heat the ammonia-rich solution to produce an ammonia-rich gas stream and the acidic solution. In certain embodiments, the system further includes a carbon dioxide absorber configured to receive both the ammonia-rich gas stream and a carbon dioxide-rich flue gas stream to produce the carbon dioxide-rich ammonia-based solution and a carbon-dioxide-lean gas stream. In such embodiments, the system further includes a regenerator configured to receive the carbon dioxide-rich ammonia-based solution from the carbon dioxide absorber. In certain embodiments, the system further includes an appendix stripper configured to remove any ammonia from the carbon-dioxide-lean gas stream. In certain embodiments, the carbon dioxide wash station is configured to receive a used wash water stream from an appendix stripper.

Other embodiments provide for a method for recovering ammonia from a gas stream. The method includes: heating a carbon dioxide-rich ammonia-based solution in a regenerator so as to produce a carbon dioxide-rich gas stream; operating the regenerator at a low internal pressure so that the carbon dioxide-rich gas stream includes residual ammonia; forwarding the carbon dioxide-rich gas stream including residual ammonia to a carbon dioxide wash station; and contacting the residual ammonia from the carbon dioxide-rich gas stream with an acidic solution having a dissolved acidic salt to produce an ammonia-rich solution. In certain embodiments, the internal pressure is less than or equal to 20 bara. In certain embodiments, the internal pressure is less than or equal to 5 bara. In certain embodiments, the acidic salt is a weak acid. In certain embodiments, the acidic salt is ammonium acetate or ammonium phosphate. In certain embodiments, the method further includes: forwarding the ammonia-rich solution from the carbon dioxide wash station to an ammonia stripper; and heating the ammonia-rich solution to produce an ammonia-rich gas stream and the acidic solution. In certain embodiments, the method further includes: providing the ammonia-rich gas stream to a carbon dioxide absorber; contacting the ammonia-rich gas stream with a carbon dioxide-rich flue gas to produce the carbon dioxide-rich ammonia-based solution; and providing the carbon dioxide-rich ammonia-based solution to the regenerator. In certain embodiments, the method further includes forwarding the acidic solution from the ammonia stripper to the carbon dioxide wash station. In certain embodiments, the method further includes providing used wash water from an appendix stripper to the carbon dioxide wash station.

Yet still other embodiments provide for a carbon dioxide wash for recovering ammonia from a gas stream. The carbon dioxide wash station includes a body having a first opening, a second opening, a third opening, and a fourth opening. The first and the second openings define a flow path for the gas stream within the body. The first opening is for allowing the gas stream to enter the flow path after having been generated via heating of a carbon dioxide-rich ammonia-based solution within a regenerator that operates at a low internal pressure such that the gas stream includes carbon dioxide and residual ammonia. The third opening is for receiving an acidic solution having a dissolved acidic salt that is contacted with the gas stream along the flow path so as to absorb some of the residual ammonia from the gas stream to produce an ammonia-rich solution and a carbon dioxide-rich gas stream. The second opening is for allowing the carbon dioxide-rich gas stream to exit the body. The fourth opening is for allowing the ammonia-rich solution to exit the body. In certain embodiments, the carbon dioxide wash station is configured to limit the residual ammonia in the carbon dioxide-rich gas stream that exits the body via the second opening to less than or equal to about 10 ppm when the regenerator operates at an internal pressure of less than or equal to about 20 bara. In certain embodiments, the body further has a fifth opening for receiving bottom water from an appendix stripper.

Accordingly, by utilizing an acidic solution in the $CO_2$ wash station, and integrating the $CO_2$ wash station with the ammonia stripper 16 and/or the appendix stripper, some embodiments of the invention provide for the operation of regenerators at low internal pressures, which in turn, allows for the heating of the $CO_2$-rich ammonia-based solution via low pressure steam. As low pressure steam is typically less expensive than high-pressure steam, some embodiments of the invention provide for a regenerator that has, for example, up to a 20% savings in the electrical duty over prior systems. Thus, some embodiments of the present invention may provide for an overall increase in the efficiency of an encompassing power plant.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for recovering ammonia from a gas stream, the system comprising:
    a regenerator configured to heat a carbon dioxide-rich ammonia-based solution at a low internal pressure to generate a carbon dioxide-rich gas stream comprising residual ammonia;
    a carbon dioxide wash station configured to receive both the carbon dioxide-rich gas stream and an acidic solution having a dissolved acidic salt and bring them into contact to produce an ammonia-rich solution;
    an ammonia stripper configured to heat the ammonia-rich solution to produce an ammonia-rich gas stream and the acidic solution;
    a carbon dioxide absorber configured to receive both the ammonia-rich gas stream and a carbon dioxide-rich flue gas stream to produce the carbon dioxide-rich ammonia-based solution and a carbon-dioxide-lean gas stream;
    a regenerator configured to receive the carbon dioxide-rich ammonia-based solution from the carbon dioxide absorber; and
    an appendix stripper configured to remove any ammonia from the carbon-dioxide-lean gas stream.

2. The system of claim 1, wherein the internal pressure is less than or equal to about 20 bara.

3. The system of claim 1, wherein the internal pressure is less than or equal to about 5 bara.

4. The system of claim 1, wherein the acidic salt is a weak acid.

5. The system of claim 4, wherein the acidic salt is ammonium acetate or ammonium phosphate.

6. The system of claim 1, wherein:
    the carbon dioxide wash station is configured to receive a used wash water stream from the appendix stripper.

7. A method for recovering ammonia from a gas stream comprising:
    heating a carbon dioxide-rich ammonia-based solution in a regenerator so as to produce a carbon dioxide-rich gas stream;
    operating the regenerator at a low internal pressure so that the carbon dioxide-rich gas stream comprises residual ammonia;
    forwarding the carbon dioxide-rich gas stream comprising residual ammonia to a carbon dioxide wash station;
    contacting the residual ammonia from the carbon dioxide-rich gas stream with an acidic solution having a dissolved acidic salt to produce an ammonia-rich solution; and
    providing used wash water from an appendix stripper to the carbon dioxide wash station.

8. The method of claim 7, wherein the internal pressure is less than or equal to 20 bara.

9. The method of claim 7, wherein the internal pressure is less than or equal to 5 bara.

10. The method of claim 7, wherein the acidic salt is a weak acid.

11. The method of claim 7, wherein the acidic salt is ammonium acetate or ammonium phosphate.

12. The method of claim 7 further comprising:
    forwarding the ammonia-rich solution from the carbon dioxide wash station to an ammonia stripper; and
    heating the ammonia-rich solution to produce an ammonia-rich gas stream and the acidic solution.

13. The method of claim 12 further comprising:
    providing the ammonia-rich gas stream to a carbon dioxide absorber;
    contacting the ammonia-rich gas stream with a carbon dioxide-rich flue gas to produce the carbon dioxide-rich ammonia-based solution; and
    providing the carbon dioxide-rich ammonia-based solution to the regenerator.

14. The method of claim 12, further comprising:
    forwarding the acidic solution from the ammonia stripper to the carbon dioxide wash station.

15. A carbon dioxide wash station for recovering ammonia from a gas stream comprising:
    a body having a first opening, a second opening, a third opening, and a fourth opening, the first and the second openings defining a flow path for the gas stream within the body; and wherein the first opening is for allowing the gas stream to enter the flow path after having been generated via heating of a carbon dioxide-rich ammonia-based solution within a regenerator that operates at a low internal pressure such that the gas stream includes carbon dioxide and residual ammonia, the third opening is for receiving an acidic solution having a dissolved acidic salt that is contacted with the gas stream along the flow path so as to absorb some of the residual ammonia from the gas stream to produce an ammonia-rich solution and a carbon dioxide-rich gas stream, the second opening is for allowing the carbon dioxide-rich gas stream to exit the body, and the fourth opening is for allowing the ammonia-rich solution to exit the body; and
    wherein the body further has a fifth opening for receiving bottom water from an appendix stripper.

16. The carbon dioxide wash of claim 15, wherein the carbon dioxide wash station is configured to limit the residual ammonia in the carbon dioxide-rich gas stream that exits the body via the second opening to less than or equal to about 10 ppm when the regenerator operates at an internal pressure of less than or equal to about 20 bara.

* * * * *